UNITED STATES PATENT OFFICE.

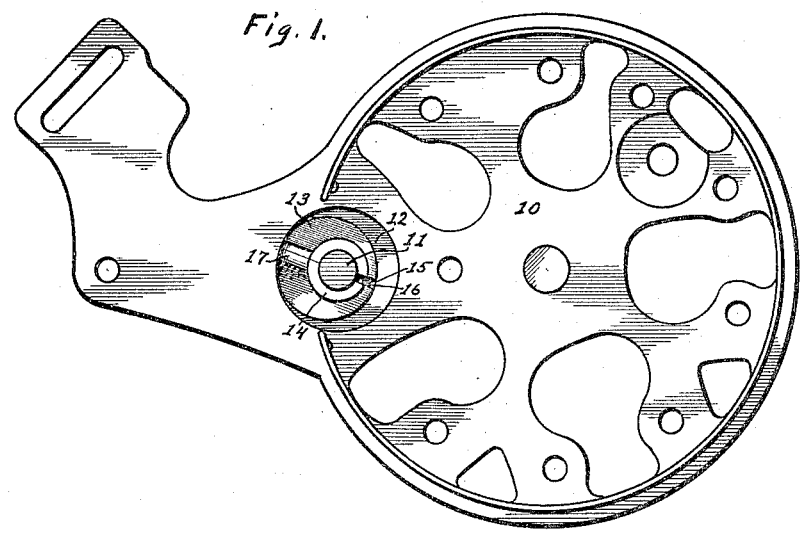
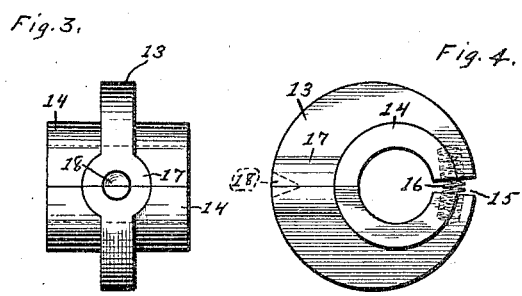
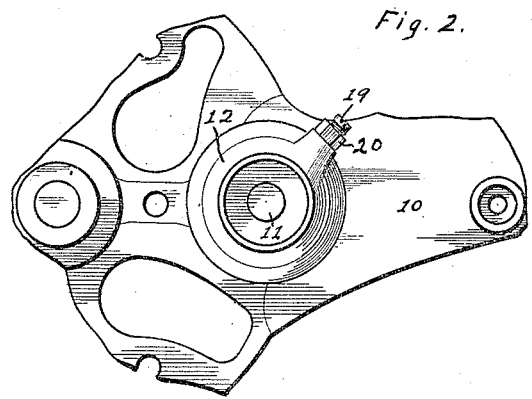

ANDREW J. DINKEL, OF CLARINDA, IOWA.

SHAFT-BEARING.

1,182,529.  Specification of Letters Patent.  Patented May 9, 1916.

Application filed August 23, 1915. Serial No. 46,848.

*To all whom it may concern:*

Be it known that I, ANDREW J. DINKEL, citizen of the United States of America, and resident of Clarinda, Page county, Iowa, have invented a new and useful Shaft-Bearing, of which the following is a specification.

The object of this invention is to provide an improved construction for a plain bearing.

A further object of this invention is to provide improved means for adjusting a plain bearing.

A further object of this invention is to provide improved means for at all times holding the bearing rigidly in its support regardless of the adjustment.

My invention consists in the construction, arrangement and combination of elements hereinafter set forth, pointed out in my claims and illustrated by the accompanying drawing, in which—

Figure 1 is an inner side elevation of a detached side frame or casing of a lawn mower equipped with my improved bearing, the reel shaft being shown in section. Fig. 2 is an outer side elevation of a portion of the same. Fig. 3 is a rear elevation of the bearing, on an enlarged scale, and Fig. 4 is a side elevation of the same.

In the construction and mounting of the device as shown the numeral 10 designates a support, in this instance one of the side frames of a lawn mower of any well known or desired construction, through which a shaft 11, in this instance the reel-bearing shaft, is mounted for rotation. The support 10 is formed with a circular boss or seat 12, in which my improved bearing is mounted. A disk 13 is formed of mating members and fitted to the seat 12, the mating members meeting on a diameter of the disk. An elongated bearing 14 is formed in the mating members of the disk 13, one-half of said bearing being formed in each of said members. The bearing 14 is mounted eccentrically relative to the disk 13, and is designed to receive the shaft 11 for rotary movement of said shaft. The bearing 14 and disk 13 are notched or cut away as at 15, on that side of the disk nearest to said bearing. The mating members of the disk 13 are formed with seats in alinement with each other on opposite sides of the notch 15, and an expansive coil spring 16 is mounted in said seats and crosses said notch. It is the function of the spring 16 to expand the members of the disk and hold said disk firmly and rigidly at all times in its seat in the support 10. The disk 13, or the mating members thereof, is formed with a boss 17 diametrically opposite to the notch 15 or on the side farthest from the bearing 14, and said boss is formed with a conical seat 18 at its outer end, on the periphery of the disk. A screw 19 is threaded radially through the boss 12 of the casing 10, in alinement with the boss 17, and the point of said screw is adapted to enter, to greater or less extent, the conical seat 18. It is the function of the screw 19 to provide means for the adjustment of the bearing, to maintain the bearing in proper relation to the shaft 11, as to the fit of the shaft therein. As the screw 19 is withdrawn from the seat 18, the members of the bearing are loosened or moved away from the shaft 11, owing to the eccentric mounting of the bearing and the action of the spring 16. As the screw 19 is moved inwardly relative to the seat 18, the bearing members are tightened or moved toward the shaft, against the action of the spring 16, such movement being permitted by the notch 15. Any desired degree of adjustment of the bearing may be obtained relative to the shaft, and the spring 16 acts at all times, regardless of the extent of such adjustment, to hold the disk and bearing solidly in the support. Thus wear and racking may easily be compensated by manipulation of the screw 19, which preferably is provided with a locking nut 20 adapted to be screwed down against the outer face of the boss 12.

The advantage of this simple, plain bearing will be apparent, especially to those familiar with the construction and operation of lawn mowers. It is obvious, however, that it may be employed advantageously in other machines and devices.

Particular stress should be laid on the fact that the bearing is at all times held rigidly in its seat in the support, regardless of the adjustment relative to the shaft.

I claim as my invention—

1. A device of the class described, comprising a support formed with a seat, a split disk mounted in said seat, a bearing mounted in said disk and arranged eccentrically thereof, and yielding pressure devices acting to hold said disk securely in its seat.

2. A device of the class described, comprising a support formed with a seat, a split disk mounted in said seat, a bearing mounted in said disk and arranged eccentrically thereof, yielding pressure devices on one side between the members of said disk, and means opposite to said yielding pressure devices for adjusting the position of the members of the disk.

3. A device of the class described, comprising a support formed with a circular seat, a disk split diametrically and mounted in said seat, a bearing formed in said disk on the line between its members and arranged eccentrically relative to the disk, said disk and bearing being notched on the side of the disk nearest to the bearing, yielding pressure devices mounted in said notch, and means opposite to said notch for separating the members of the disk.

4. A device of the class described, comprising a support formed with a circular seat, a disk split diametrically and mounted in said seat, a bearing formed in said disk on the line between its members and at one side of the center thereof, said disk and bearing being formed with a notch opening from the bearing to the margin of the disk nearest thereto, a spring mounted in said notch and tending to spread the disk members on that side, and means for spreading the disk members at the side opposite to the notch.

5. A device of the class described, comprising a support formed with a circular seat, a disk split diametrically and mounted in said seat, a bearing formed in said disk on the line between its members and at one side of the center thereof, said disk and bearing being formed with a notch opening from the bearing to the margin of the disk nearest thereto, an expansive coil spring mounted in said notch, said disk being formed with a seat between its members opposite to the said notch, and a screw mounted in said support and adapted to enter said latter seat.

6. A device of the class described, comprising a support formed with a circular seat, a disk split diametrically and mounted in said seat, a bearing formed in said disk on the line between its members and at one side of the center thereof, said disk and bearing being formed with a notch opening from the bearing to the margin of the disk nearest thereto, an expansive coil spring mounted in said notch, said disk being formed with a seat between its members opposite to the notch, a screw threaded in said support and adapted to enter the latter seat, and a locking nut on said screw.

Signed by me at Clarinda, Iowa, this 11th day of August, 1915.

ANDREW J. DINKEL.

Witnesses:
 HERMAN H. TOLL,
 F. C. DUFF.

Copies of this patent may be obtained for five cents each, by addressing the "Commissioner of Patents, Washington, D. C."